Dec. 16, 1952 F. HUNZIKER 2,621,937
INDEXING CHUCK
Filed Aug. 16, 1949 3 Sheets-Sheet 1

INVENTOR.
FRED HUNZIKER.
BY
Richey & Watts
ATTORNEYS

Dec. 16, 1952 F. HUNZIKER 2,621,937
INDEXING CHUCK
Filed Aug. 16, 1949 3 Sheets-Sheet 3

INVENTOR.
FRED HUNZIKER
BY Richey T Watts
ATTORNEYS

Patented Dec. 16, 1952

2,621,937

UNITED STATES PATENT OFFICE 2,621,937

INDEXING CHUCK

Fred Hunziker, University Heights, Ohio, assignor to The Weatherhead Company, Cleveland, Ohio, a corporation of Ohio Application August 16, 1949, Serial No. 110,659

8 Claims. (Cl. 279—5)

This invention relates to chucks, and more particularly to indexing chucks of the type that have movable jaws that can be indexed without stopping chuck rotation.

Indexing chucks of the type to which this invention relates are generally employed in mass production schedules and are usually operated by pneumatic or other motor means so that the indexing operation takes place rapidly in response to the application of considerable force. This imposes a relatively great strain upon the parts which, in conjunction with the severe use given the chuck, renders the indexing mechanism subject to rapid wear, breakage, looseness, and misalignment of the parts, all of which destroy the accuracy of the positioning mechanism.

It is an object of the present invention to provide an indexing chuck that is extremely rugged in construction and includes a relatively few number of simple, strong, and long-wearing parts so that the indexing mechanism will serve for long periods of time without appreciable wear, breakage, or loss of accuracy in the positioning function.

It is a feature of the invention that delicate toothed wheels having a large number of teeth cooperating with delicate latches and pawl means are not required, the number of teeth on the wheel being equal to the number of indices per revolution and the engaging surface portions of the latches and pawls being unusually large.

Another object of the invention resides in the employment of an abutment face on the indexing wheel to cam the latch clear as the indexing motion continues.

A further object resides in providing cooperating indexing and latch structure which engage wide area faces and opposed sides of the indexing wheel axis, one of the elements including a cam surface for firmly positioning the wheel between the opposed faces and positively preventing rotation in either direction of the indexing wheel.

Another object resides in providing an indexing structure that is readily adaptable to actuation by means reciprocating parallel to the axis of rotation of the chuck by which construction unbalance is minimized during the indexing operation.

A further object resides in making the preciseness of the latching means independent of the exact position of the actuating means.

Briefly these objects and advantages are accomplished by forming an indexing wheel having pairs of diverging abutment faces of large area. The indexing assembly is pivoted to the chuck and includes a cam surface for engaging one of the abutment faces, one side of the wheel axis having a large, rugged pawl pivoted on the same member. The member is connected to a reciprocating rod which, when moving in one direction, withdraws the cam surface from the index wheel and slips the pawl over the wheel. The wheel is prevented from rotation during this operation by a latch movably mounted to engage an abutment face on the other side of the wheel axis. When the reciprocating member is moved in the other direction the pawl indexes the wheel and one of the wheel abutment faces cams the latch clear to permit this action. As the index is completed the cam surface on the indexing member engages another abutment surface on the wheel and the latch is caused to engage a diametrically-opposed surface thereby positively locating the wheel. The actuating means can continue for a certain extent of motion after the wheel is positioned, thereby assisting in retaining the parts in position without affecting their position.

The manner in which these and other objects and advantages may be obtained by one skilled in the art will be apparent from the following detailed description of my invention.

Figure 1:
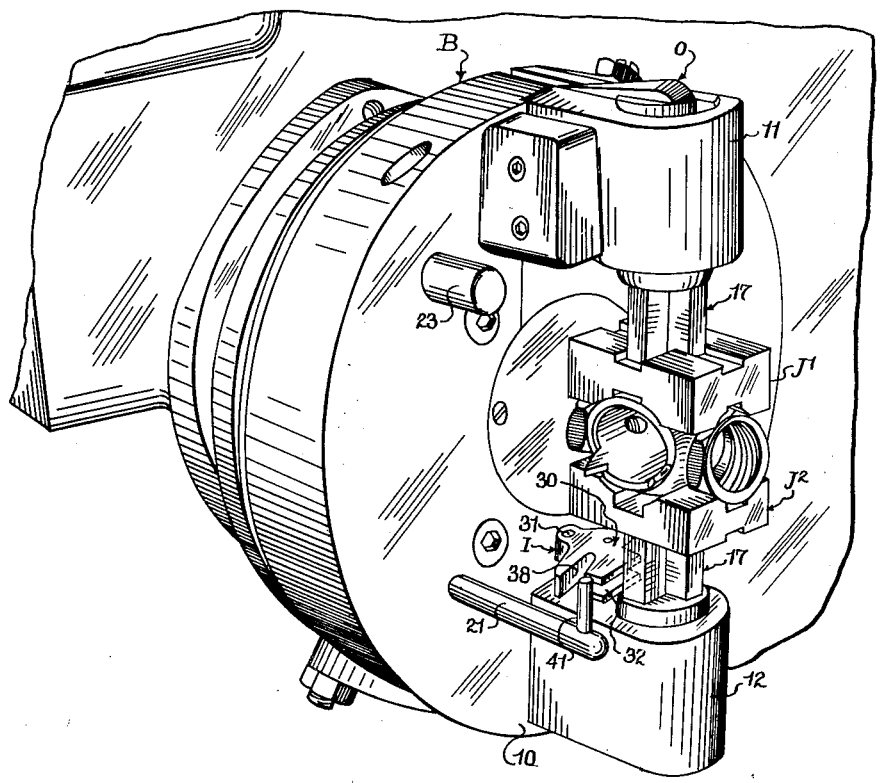
Fig. 1 is a perspective view of the clutch.
Figure 2:
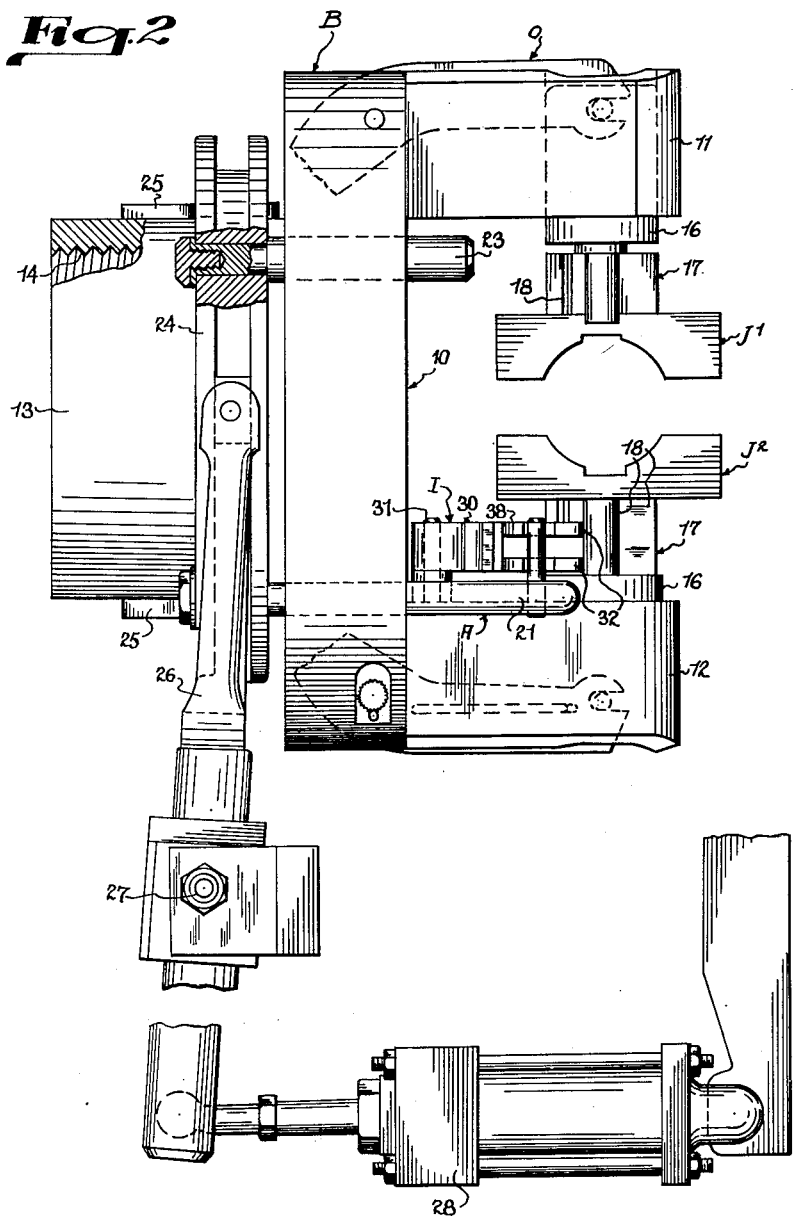
Fig. 2 is a side elevation thereof.

The chuck includes a body B rotatably to be mounted on the lathe or other machine tool, working holding jaws $J_1$ and $J_2$ for clamping between them work W, mechanism O for opening and closing the jaws, indexing mechanism I, and actuating mechanism A for the indexing mechanism. The body B includes a circular plate-like member 10 having axially extending brackets 11 and 12 for supporting the chuck jaws and associated mechanism. Rearwardly of the chuck and suitably fastened to plate 10 is a sleeve 13, suitably threaded as at 14 for mounting on the spindle of a lathe or other machine tool. The jaws $J_1$ and $J_2$ are mounted on radially slidable thimbles 16 carried by the brackets 11 and 12. The thimbles are actuated by the opening and closing mechanism O to grip and release the work W.

The details of this mechanism as well as the details of the thimble assembly form no part of the invention, a suitable structure being shown in my copending application, Serial No. 33,555, filed June 17, 1948, entitled "Indexing Chuck," Patent No. 2,502,260, March 28, 1950.

The jaws $J_1$ and $J_2$ are supported by indexing wheels 17 which are rotatably mounted in the thimbles 16 by any suitable means such as by spaced bearings as disclosed in my aforesaid pending application. Only one of the members 17 need function as an indexing wheel, this being the member supporting the jaw $J_2$ in the figures. The device shown is intended to provide four indexing steps per revolution, and the indexing wheel 17 has four pairs of diverging, generally radial surfaces 18 which provide broad abutment surfaces for the indexing and latch mechanism and give the indexing wheel the shape of a cross-like member.

The actuating mechanism for the indexing and latch assemblies include a pair of axially reciprocable rods 21 and 22 and a pair of guide rods 23 slidable through the body 10 and connected at their inboard ends to a collar 24 slidable on sleeve 13 and keyed thereto as by key members 25. Thus, the collar 24 and the attached rods rotate with the chuck. In order to reciprocate the actuating rods 21 and 22, fluid motor means may be provided which, by means of a bail 26 connected to the grooved collar 24 in the usual manner, are pivoted to the frame of the tool as at 27, and actuated by a pneumatic or a hydraulic cylinder 28. The arrangement shown for reciprocating the rods forms no part of the invention and other devices arranged to reciprocate rods 21 and 22 may be employed without departing from the essence of the invention.

Figure 3:
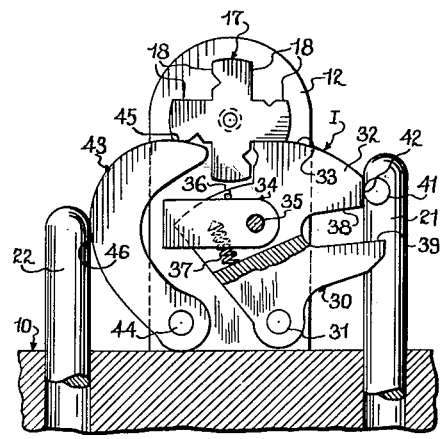
Fig. 3 is a fragmentary view showing the indexing wheel locked.

The indexing mechanism I includes a cam member 30 pivoted to bracket 12 as at 31. A portion of the cam is notched as at 32, the periphery of the notched section 33 forming a curved cam surface which diverges outwardly from a center about the pivot 31. Within the notch 32 is mounted a pawl 34 pivoted to the cam as at 35 and normally urged against a stop 36 by means of a spring 37. In order to provide for actuation of the cam it is slotted as at 38, one arm of the slot being longer than the other as at 39. A pin 41 is mounted in rod 21 and formed to ride in slot 38. With the parts in the working position shown in Fig. 3, the pin engages an axial face 42 on the cam member to hold it in its located position. A latch member 43 is pivoted to the bracket 12 as at 44 and has a cam surface 45 for wedgingly engaging the surface of the index wheel on the opposite side of the wheel axis to the surface engaged by cam surface 33 on the cam. Cam 43 is configured as at 46 for engagement by the periphery of the latch rod 22.

In operation and during the working cycle rods 21 and 22 are in their extended position as a result of manipulation of the control valve for the hydraulic or air cylinder. As mentioned previously pin 41, which is positioned against axial surface 42 of the cam 30, holds the cam surface 33 against one side of the indexing wheel. The cam surface 45, which is wedged against another surface of the indexing wheel causes the wheel to be firmly engaged or wedged between the cam and the latch so that the work is accurately positioned.

Figure 4:
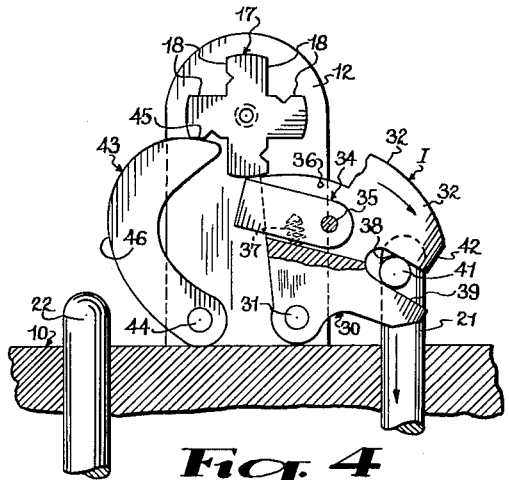
Fig. 4 is a similar view during the retract or idle stroke.

Upon retraction of the rods 21 and 22, as seen in Fig. 4, the pawl slides over the wheel as the cam 30 is rotated, latch 43 positively preventing rotation of the work piece. This action continues until the pawl springs behind one of the radial faces of the indexing wheel which occurs at or before completion of the retract stroke.

Figure 5:
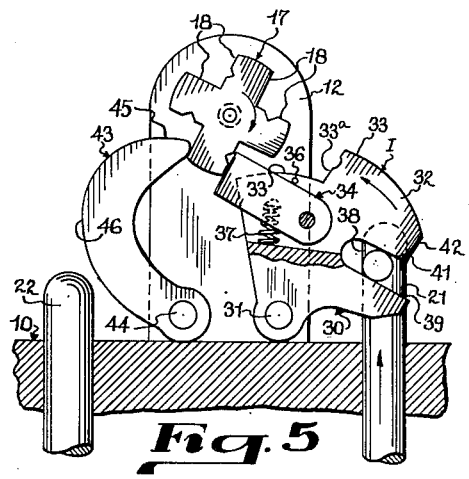
Fig. 5 shows the indexing stroke partially completed.

When the indexing stroke begins, the rods move forwardly, rotation of the cam is reversed and, as seen in Fig. 5, the pawl forces the indexing wheel around. It will be noted that since pin 22 clears the latch 43 at this time, the radial surface of the wheel opposite the pawl moves the latch 43 out of position permitting indexing of the wheel. As the cam pivots the radial surface 33a catches a corner of the wheel and continues the indexing action until the latch 43 (which is now being urged to the right in the drawings by pin 22) engages a radial surface of the wheel and precisely positions it against surface 33 of the cam 30. The parts are now returned to the position shown in Fig. 3. The final motion of the rods 21 and 22 completes the wedging action, it being noted that rod 21 merely slides across the axial face 42 on the cam.

Figure 6:
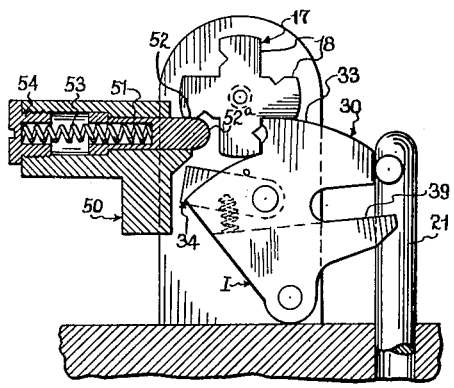
Figs. 6 and 7 show a modified form of latch means in two positions.
Figure 7:
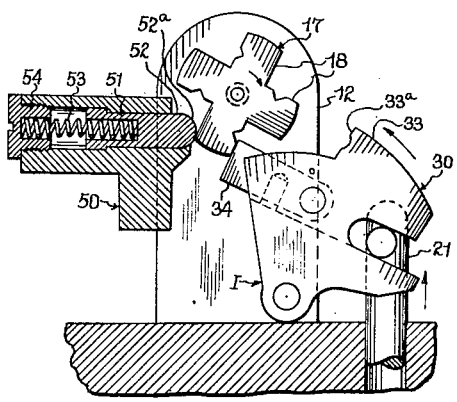

In the form shown in Figs. 6 and 7, the indexing cam is like that just described except that a change is made in the latching mechanism. Mounted in bracket 50 is a latch plunger pin 51 that engages at its periphery 52 one radial face of the indexing wheel. The latch is held in its extended position by means of a spring 53 backed up by suitable retaining nut 54. The latch has a rounded nose 52a.

In the work position shown in Fig. 6, the indexing wheel is positively positioned by the co-action of the pin 52 and the cam surface 33 which are on opposite sides of the wheel center. When the rod 21 is retracted, the pawl 34 slips over the wheel which is prevented from rotation by the pin 51. At the completion of the retract stroke, the pawl is in position to abut a corner of the wheel so that (as shown in Fig. 7) when the rod 21 is advanced on its indexing stroke the wheel is rotated and engages the rounded nose 52a to retract the latch lunger 51. Toward the completion of the retract stroke, surface 33a of the cam may assist in completing the final motion of the wheel, and a point is reached wherein the nose 52a of the plunger may slip past the corner of the wheel and complete the indexing motion, urging the wheel against the cam surface 33. The parts are now in the work position shown in Fig. 6.

Having completed a detailed description of the invention it can be seen that I have provided an indexing chuck that is of sturdy construction, made of simple, relatively unbreakable parts, requires no finely toothed wheels, is positively latched, and is adapted to operation by axially-reciprocating rods.

Although I have described a preferred embodiment of the invention so that those skilled in the art may practice the same, it will be apparent that modifications of the described forms may be made without departing from the essence of the invention as defined in the appended claims.

What is claimed is:

1. An indexing chuck comprising a body for attachment to a machine tool, a pair of aligned chuck jaws mounted on said body for indexing rotation about a diametric axis and for relative opening and closing motion along said axis, means mounted on said body for opening and closing said jaws, an indexing wheel for one of said jaws and having a plurality of generally radial abutment faces, a movable latch on body having a face for engaging one of said abutment faces for positively preventing rotation of said wheel in one direction, indexing means movably mounted on said body, said indexing means including a cam surface for engaging another abutment face to the other side of the wheel axis so as to urge said one abutment face against said latch surface and simultaneously prevent rotation of said wheel in the other direction, said indexing means including a pawl for engaging a portion of said indexing wheel disposed between said engaged abutment faces, and reciprocating actuating means in said body connected to said indexing means to oscillate the same to withdraw the cam surface and slip the pawl over said wheel portion when moved in one direction, and to index the wheel and bring the cam surface against a new abutment face when moved in the other direction.

2. An indexing chuck comprising a body for attachment to a machine tool, a pair of aligned chuck jaws mounted on said body for indexing rotation about a diametric axis and for relative opening and closing motion along said axis, means mounted on said body for opening and closing said jaws, an indexing wheel for one of said jaws and having a plurality of generally radial abutment faces, a movable latch on said body having a face for engaging one of said abutment faces for positively preventing rotation of said wheel in one direction, indexing means movably mounted on said body, said indexing means including a cam surface for engaging another abutment face to the other side of the wheel axis so as to urge said one abutment face against said latch surface and simultaneously prevent rotation of said wheel in the other direction, said indexing means including a pawl for engaging a portion of said indexing wheel disposed between said engaged abutment faces, and reciprocating actuating means in said body connected to said indexing means to oscillate the same to withdraw the cam surface and slip the pawl over said wheel portion when moved in one direction, and to index the wheel and bring the cam surface against a new abutment face when moved in the other direction, said indexing wheel engaging and retracting said latch during the indexing motion.

3. An indexing chuck comprising a body for attachment to a machine tool, a pair of aligned chuck jaws mounted on said body for indexing rotation about a diametric axis and for relative opening and closing motion along said axis, means mounted on said body for opening and closing said jaws, an indexing wheel for one of said jaws and having a plurality of recesses forming diverging pairs of abutment faces, a movable latch on said body having a face for engaging one of a first pair of said abutment faces for positively preventing rotation of said wheel in one direction, indexing means movably mounted on said body, said indexing means including a cam surface for engaging one of a second pair of abutment faces disposed on the other side of the wheel axis so as to urge said first-named abutment face against said latch surface and simultaneously prevent rotation of said wheel in the other direction, said indexing means including a pawl for engaging a portion of said indexing wheel disposed between said engaged abutment faces, and reciprocating actuating means in said body connected to said indexing means to oscillate the same to withdraw the cam surface and slip the pawl over said wheel portion when moved in one direction, and to index the wheel and bring the cam surface against a new abutment face when moved in the other direction, the other of said first pair of abutment faces engaging and retracting said latch during the indexing motion.

4. An indexing chuck comprising a body for attachment to a machine tool, a pair of brackets extending axially from the face of said body, a pair of aligned chuck jaws mounted on said brackets for indexing rotation about a diametric axis and for relative opening and closing motion along said axis, means mounted on said body for opening and closing said jaws, an indexing wheel for one of said jaws and having a plurality of generally radial abutment faces, a movable latch for engaging one of said abutment faces for positively preventing rotation of said wheel in one direction, indexing means for said wheel pivotally mounted on the associated bracket axially inwardly of said wheel, said indexing means including a cam surface for engaging another abutment face to the other side of the wheel axis so as to urge said one abutment face against said latch and simultaneously prevent rotation of said wheel in the other direction, said indexing means including a pawl for engaging a portion of said indexing wheel disposed between said engaging abutment faces, and actuating means mounted on said body for reciprocation parallel to the axis of chuck rotation, said actuating means being connected to said indexing means to oscillate the same to withdraw the cam surface and slip the pawl over said wheel portion when moved in one direction, and to index the wheel and bring the cam surface against a new abutment face when moved in the other direction.

5. An indexing chuck comprising a body for attachment to a machine tool, a pair of aligned chuck jaws mounted on said body for indexing rotation about a diametric axis and for relative opening and closing motion along said axis, means mounted on said body for opening and closing said jaws, an indexing wheel for one of said jaws and having a plurality of generally radial abutment faces, a movable latch on said body having a face for engaging one of said abutment faces for positively preventing rotation of said wheel in one direction, indexing means movably mounted on said body, said indexing means including a cam surface for engaging another abutment face to the other side of the wheel axis so as to urge said one abutment face against said latch surface and simultaneously prevent rotation of said wheel in the other direction, said indexing means including a pawl for engaging a portion of said indexing wheel disposed between said engaged abutment faces, a pair of connected axially-reciprocating actuating means in said body, one of said means being connected to said indexing means to oscillate the same to withdraw the cam surface and slip the pawl over said wheel portion when moved in one direction, and to index the wheel and bring the cam surface against a new abutment face when moved in the other direction, the other of said actuating means having a surface for engaging said latch and moving it to its latch position, said other actuating means clearing the latch during the indexing motion of said wheel.

6. An indexing chuck comprising a body for attachment to a machine tool, a pair of brackets extending axially from the face of said body, a pair of aligned chuck jaws mounted on said brackets for indexing rotation about a diametric axis and for relative opening and closing motion along said axis, means mounted on said body for opening and closing said jaws, an indexing wheel for one of said jaws and having a plurality of generally radial abutment faces, a movable latch for engaging one of said abutment faces for positively preventing rotation of said wheel in one direction, indexing means for said wheel pivotally mounted on the associated bracket axially inwardly of said wheel, said indexing means including a cam surface for engaging another abutment face to the other side of the wheel axis so as to urge said one abutment face against said latch and simultaneously prevent rotation of said wheel in the other direction, said indexing means including a pawl for engaging a portion of said indexing wheel disposed between said engaging abutment faces, and actuating means mounted in said body for reciprocation parallel to the axis of chuck rotation, said actuating means being connected to said indexing means to oscillate the same to withdraw the cam surface and slip the pawl over said wheel portion when moved in one direction, and to index the wheel and bring the cam surface against a new abutment face when moved in the other direction, said wheel engaging and retracting said latch during indexing motion.

7. An indexing chuck comprising a body for attachment to a machine tool, a pair of brackets extending axially from the face of said body, a pair of aligned chuck jaws mounted on said brackets for indexing rotation about a diametric axis and for relative opening and closing motion along said axis, means mounted on said body for opening and closing said jaws, an indexing wheel for one of said jaws and having a plurality of generally radial abutment faces, a movable latch for engaging one of said abutment faces for positively preventing rotation of said wheel in one direction, indexing means for said wheel pivotally mounted on the associated bracket axially inwardly of said wheel, said indexing means including a cam surface for engaging another abutment face to the other side of the wheel axis so as to urge said one abutment face against said latch and simultaneously prevent rotation of said wheel in the other direction, said indexing means including a pawl for engaging a portion of said indexing wheel disposed between said engaging abutment faces, actuating means mounted in said body for reciprocation parallel to the axis of chuck rotation, said actuating means being connected to said indexing means to oscillate the same to withdraw the cam surface and slip the pawl over said wheel portion when moved in one direction, and to index the wheel and bring the cam surface against a new abutment face when moved in the other direction, said wheel engaging and retracting said latch during indexing motion, and means reciprocable with said actuating means for advancing said latch to its latch position after indexing of said wheel is completed.

8. An indexing chuck comprising a body for attachment to a machine tool, a pair of aligned chuck jaws mounted on said body for indexing rotation about a diametric axis and for relative opening and closing motion along said axis, means mounted on said body for opening and closing said jaws, an indexing wheel for one of said jaws and having a plurality of recesses forming diverging pairs of abutment faces, a spring-pressed latch plunger on said body for engaging one of a first pair of said abutment faces for positively preventing rotation of said wheel in one direction, indexing means movably mounted on said body, said indexing means including a cam surface for engaging one of a second pair of abutment faces disposed on the other side of the wheel axis so as to urge said first-named abutment face against said latch plunger and simultaneously prevent rotation of said wheel in the other direction, said indexing means including a pawl for engaging a portion of said indexing wheel disposed between said engaged abutment faces, and reciprocating actuating means in said body connected to said indexing means to oscillate the same to withdraw the cam surface and slip the pawl over said wheel portion when moved in one direction, and to index the wheel and bring the cam surface against a new abutment face when moved in the other direction, the other of said first pair of abutment faces engaging and retracting said latch plunger during the indexing motion.

FRED HUNZIKER.

REFERENCES CITED

The following references are of record in the file of this patent:

UNITED STATES PATENTS

| Number | Name | Date |
|---|---|---|
| 2,349,119 | Soule | May 16, 1944 |
| 2,480,715 | De Graff | Aug. 30, 1949 |
| 2,502,260 | Hunziker | Mar. 28, 1950 |

FOREIGN PATENTS

| Number | Country | Date |
|---|---|---|
| 23,433 | Great Britain | Oct. 29, 1903 |
| 328,776 | Germany | July 17, 1919 |

OTHER REFERENCES

American Machinist, page 145, July 17, 1947.